Sept. 4, 1962 E. U. LANG 3,052,274
TIRE CONSTRUCTION
Filed June 29, 1960
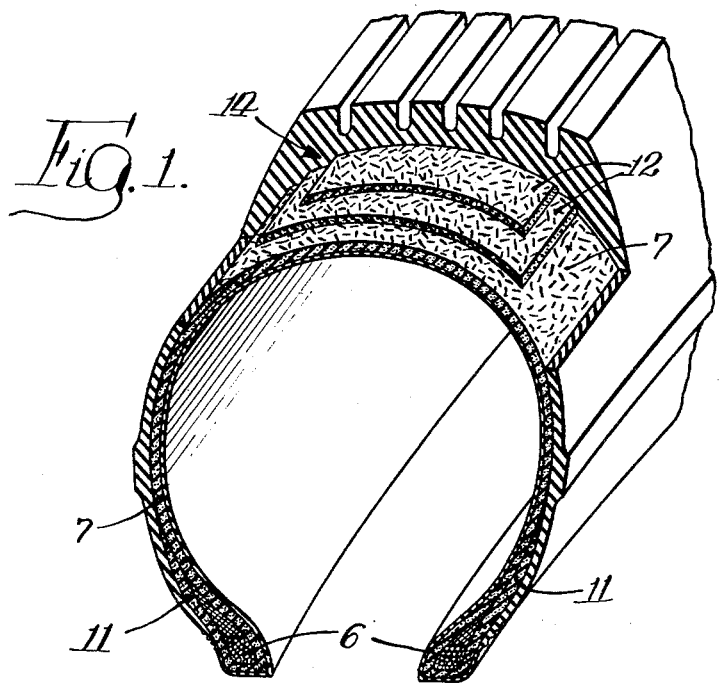
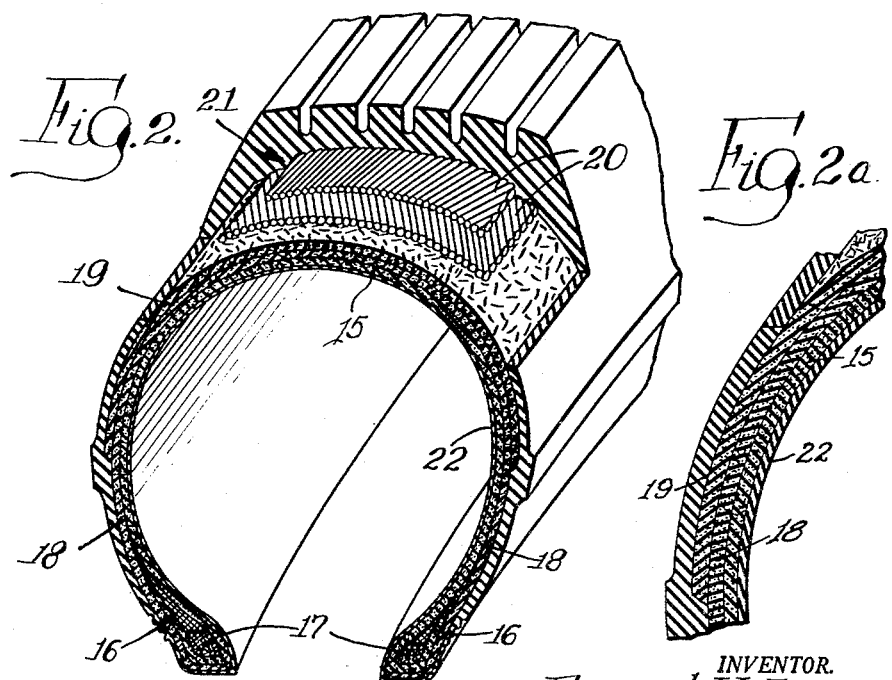
INVENTOR.
Ernest U. Lang,
BY
ATTYS.

United States Patent Office 3,052,274
Patented Sept. 4, 1962

3,052,274
TIRE CONSTRUCTION
Ernest U. Lang, Niles, Mich., assignor to National-Standard Company, Niles, Mich., a corporation of Delaware
Filed June 29, 1960, Ser. No. 39,497
8 Claims. (Cl. 152—354)

My present invention relates to improvements in tire constructions.

In the building of tires at the present time it is conventional to use tire fabric composed of rubber or like synthetic materials in which elongated strands of other materials such as cotton, rayon, nylon, or metal wires are embedded according to a predetermined pattern, usually in uniform spaced parallel relation, to reinforce the tire fabric primarily in the direction of the length of the embedded strands. Such known tire fabric is employed to form plies, breaker strips, or other components of a tire, and the direction or grain of the material is arranged in various ways to reinforce the tire. These constructions have proven satisfactory, but nevertheless have their short-comings in that they only tend to prevent resistance to tear in the direction of the strands. Greater overall strength in all directions of forces applied to a tire in use together with longer tire life are desirable, and especially under conditions encountered in present day uses of pneumatic tires.

Also in the art the concept of embodying wire or wire-like components, such as steel wool, in rubber or rubber-like material is not new, but so far as I am aware, these metal components are added primarily for purposes of seeking to strengthen the tire, but without appreciably affecting the elasticity of the rubber or rubber component of the tire fabric. So far as I am aware, such fabrics have been employed as reinforcing components in other portions of a tire but have not comprised the plies for the tire which encompass the bead rings.

Also, it is known to incorporate short lengths of fine wire in the tread components of tires which adds to the strength and wear characteristics of the treads.

I have discovered that highly improved tires may be constructed by embodying one or more plies of fabric comprising rubber or rubbery material in which short lengths of fine high tensile steel wire are randomly disposed, and in which at least one of such plies encircle or encompass the bead rings of the tires. The ply fabric for use in my invention may be readily fabricated by milling the rubber component with short lengths of high tensile steel wire so that the latter are embedded in the rubber in a random pattern. The ply material thus formed may be used in a conventional way in the building of a tire carcass on a cylindrical forming drum, and thereafter formed and cured. I have found that a tire thus formed has an inextensible casing of substantially less elasticity than the rubber of the tire fabric, and has a higher resistance to tear in all directions than any presently known tire. It is important in the tire construction of my invention that tire fabric material as noted for at least one ply be so arranged in the building of the tire carcass as to go completely around the bead rings to encase the same. With a tire constructed as noted, the randomly disposed short steel lengths of wire in the rubbery material afford tear resistance in all directions of forces to which the tire is subjected in use and the overlapping of the ply about the bead rings provides a tire of much greater strength and durability than other presently known constructions.

Accordingly, it is an object of my present invention to provide a tire construction including at least one ply formed of rubbery material in which short lengths of high tensile steel wire are randomly disposed, and in which the aforementioned ply is arranged to encompass the bead rings of the tire.

Now in order to acquaint those skilled in the art with the manner of practicing and utilizing my invention, I shall describe in connection with the accompanying drawings certain preferred embodiments of my invention.

FIGURES 1 and 2 show in perspective exploded relation components of two forms of tires constructed in accordance with the principles of my present invention.

FIGURE 2a is an enlarged detail sectional view of a portion of a side wall of the tire of FIGURE 2.

Referring now to FIGURE 1, I have shown in somewhat diagrammatic perspective and in transverse cross-section a portion of a tire constructed in accordance with my invention. The illustrated tire comprises a pair of annular bead rings 6 disposed in spaced parallel relation lengthwise of the axis of rotation of the tire and a single ply 7 of substantially torus extending between and around the bead rings to provide a tire of conventional configuration. In the form of tire illustrated, it will be observed that the body portion includes ply 7, as shown, having its opposite end edge portion 11—11 disposed around and enclosing the bead rings 6. The tire may further include breaker strips 12 encompassing the outer periphery of the body of the tire, and disposed between the aforedescribed ply and an outer tread 14. It will be understood that the tire of my invention may comprise other known components such as fillers and the like, as desired, and that my present invention may be utilized in tires with bead rings of any desired style and construction.

In a typical tire as above describd constructed in accordance with my invention, it is preferable that the ply 7 be of tire fabric composed of rubbery material or other like synthetic materials in which short lengths of fine wires, such as steel, are randomly disposed. It is preferable that the wires be of high tensile steel and in a range of from 0.004 to 0.01 inch in diameter, and from 0.3 to 1.5 inches in length. The aforementioned wires may be randomly disposed in the rubbery material by milling the wires and rubbery material together, it being preferable to incorporate as much wire by the milling process as the rubbery material will retain. The tire fabric may be made of any conventional thickness normally used in plies of conventional tires. It is essential in practicing my invention that the ply 7 completely encircle the spaced annular bead rings 6. Tire fabric as above related may be utilized in conventional cylindrical drum tire building machines to construct tires according to known methods in that regard and provide a finished tire embodying my invention.

The embedding of short lengths of high tensile steel wires in the rubbery material of the tire ply I have found offers unexpected substantial tear resistance in all directions against forces to which tires are subjected to in use. In the milling of the fine wires in the rubbery material, the wires should preferably be present in an amount so as to overlap with each other throughout the length and width of the tire fabric to achieve most efficient tear resistance. The tensile strength of the wires employed should be of an amount to sustain the conditions to which the tire will be subjected, and in this regard we have found in most instances that tensile strength greater than 300,000 p.s.i. to be sufficient.

In the utilization of high tensile steel wires in rubber to form the tire fabric, it is desirable to brass coat the wires to afford good adhesion with the rubber so that the components do not separate from each other when embodied in a tire. In the use of resilient materials other than rubber, the wires should have good adhesion in the material in which they are embedded.

The resultant tire product after curing results in a body portion that is substantially inextensible and is characterized by being more extensible than steel, but affords greater resistance to stretching or elongation than rubber.

Referring now to FIGURE 2, I have illustrated another embodiment of my invention applied to the construction of a 2-ply tire including certain optional components. The tire shown comprises an inner ply 15 extending between annular bead rings 17, and the ply 15 has its end portions 16—16 extending around and enclosing the bead rings 17. An outer ply 18 extends about the outer surface of inner ply 15 and between and partially around the axially spaced apart bead rings 17. The tire may further comprise a breaker strip 19, extending about the periphery of ply 18 with one edge thereof disposed approximately mid-way from one side wall, as best seen in FIGURE 2a, and with its other edge in like position with respect to the other side wall of the tire. Also, breaker strips 20 may be disposed to lie between the breaker strip 19 and the outer tread 21 for the tire. The inner and outer plies 15 and 18, respectively, are preferably made of fabric as aforedescribed from which the ply 7 of the first described embodiment of our invention is made. The breaker strip 19, if desired, may be made of material like that of plies 15 and 18. The breaker strips 20 may include elongated strands as illustrated to serve as reinforcing components. Also, a conventional sealant liner 22 may be provided to coat the inner surface of the tire.

From the above, it is obvious, therefore, that many variations of my invention may be used, but it is essential, as previously noted, that at least one ply of the tire of my invention be composed of tire fabric, as aforementioned, of rubbery material having fine wires embedded therein, and with the arrangement being such in the finished tire that the edge portions of the ply fully encompass the spaced apart annular beads.

Other of the components of the tire such as the tread may, if desired, be made of fabric reinforced by wire such as described for the tire fabric for the ply or plies.

While I have shown and described a preferred embodiment of my invention, it will be understood that various modifications and rearrangements may be made therein without departing from the spirit and scope of my invention.

I claim:
1. A tire comprising a pair of annular bead rings, and a body portion comprising a single ply only of tire fabric extending between and enclosing said bead rings, and said ply consisting essentially of rubbery material having short lengths of high tensile wire randomly disposed in said rubbery material to render said ply less elastic than said rubbery material.

2. A tire comprising a pair of annular bead rings, and a body portion comprising a single ply only of tire fabric extending between and enclosing said bead rings, and said ply consisting essentially of rubbery material and high tensile steel wires randomly disposed in said rubbery material to render said ply less elastic than said rubbery material, and with said steel wires being in a range of from 0.004 to 0.01 inch in diameter, and in a range of from 0.3 to 1.5 inches in length.

3. The tire of claim 2 characterized by said steel wires having a coating affording adhesion with said rubbery material.

4. The tire of claim 2 characterized by said rubbery material consisting essentially of rubber, and in which steel wires having a grass coating for affording adhesion thereto.

5. A tire comprising a pair of annular bead rings, and a body portion comprising at least one ply of tire fabric extending between and enclosing said bead rings, and said ply consisting essentially of rubbery material and short lengths of high tensile wire randomly disposed in said rubbery material to render said ply less elastic than said rubbery material.

6. A tire comprising a pair of annular bead rings, and a body portion comprising at least one ply of tire fabric extending between and enclosing said bead rings, and said ply consisting essentially of rubbery material and high tensile steel wires randomly disposed in said rubbery material to render said ply less elastic than said rubbery material, said steel wires being in a range of from 0.004 to 0.01 inch in diameter, and in a range of from 0.3 to 1.5 inches in length, and said ply extending between and enclosing said bead rings.

7. The tire of claim 6 characterized by said steel wires having a coating affording adhesion to said rubbery material.

8. The tire of claim 6 characterized by said rubbery material consisting essentially of rubber, and in which said steel wires having a brass coating for affording adhesion to said rubber.

References Cited in the file of this patent
UNITED STATES PATENTS

| | | |
|---|---|---|
| 1,117,994 | Freeman | Nov. 24, 1914 |
| 1,629,517 | Marshall | May 24, 1927 |
| 2,056,012 | Madge et al. | Sept. 29, 1936 |
| 2,605,201 | Howe | July 29, 1952 |
| 2,960,139 | Engstrom et al. | Nov. 15, 1960 |

FOREIGN PATENTS

| | | |
|---|---|---|
| 1,029,693 | Germany | May 8, 1958 |